(12) United States Patent
Jones et al.

(10) Patent No.: US 7,890,642 B2
(45) Date of Patent: Feb. 15, 2011

(54) DEVICE INTERNET RESOURCE ACCESS FILTERING SYSTEM AND METHOD

(75) Inventors: Kevin Brian Jones, Newcastle-under-Lyme (GB); Richard Pointon, Scholar Green (GB)

(73) Assignee: Websense UK Limited, London (GB)

( * ) Notice: Subject to any disclaimer, the term of this patent is extended or adjusted under 35 U.S.C. 154(b) by 1074 days.

(21) Appl. No.: 10/942,635

(22) Filed: Sep. 16, 2004

(65) Prior Publication Data

US 2006/0031942 A1 Feb. 9, 2006

(30) Foreign Application Priority Data

Aug. 7, 2004 (GB) .................. 0417620.2

(51) Int. Cl.
*G06F 15/16* (2006.01)
(52) U.S. Cl. .................. 709/229; 709/228; 709/246
(58) Field of Classification Search .................. 709/220, 709/223, 228, 229, 246
See application file for complete search history.

(56) References Cited

U.S. PATENT DOCUMENTS

| 4,423,414 A | 12/1983 | Bryant et al. |
|---|---|---|
| 4,734,036 A | 3/1988 | Kasha |
| 4,941,084 A | 7/1990 | Terada et al. |
| 5,408,642 A | 4/1995 | Mann |
| 5,493,692 A | 2/1996 | Theimer et al. |
| 5,541,911 A | 7/1996 | Nilakantan et al. |
| 5,548,729 A | 8/1996 | Akiyoshi et al. |
| 5,555,376 A | 9/1996 | Theimer et al. |
| 5,581,703 A | 12/1996 | Baugher et al. |
| 5,586,121 A | 12/1996 | Moura et al. |
| 5,606,668 A | 2/1997 | Shwed |
| 5,648,965 A | 7/1997 | Thadani et al. |
| 5,678,041 A | 10/1997 | Baker et al. |
| 5,682,325 A | 10/1997 | Lightfoot et al. |
| 5,696,486 A | 12/1997 | Poliquin et al. |
| 5,696,898 A | 12/1997 | Baker et al. |
| 5,699,513 A | 12/1997 | Feigen et al. |
| 5,706,507 A | 1/1998 | Schloss ..................... 395/615 |
| 5,712,979 A | 1/1998 | Graber et al. |
| 5,724,576 A | 3/1998 | Letourneau |
| 5,768,519 A | 6/1998 | Swift et al. |

(Continued)

FOREIGN PATENT DOCUMENTS

EP 0 658 837 A2 12/1994

(Continued)

OTHER PUBLICATIONS

United Kingdom Search Report dated Nov. 4, 2004 for corresponding UK application GB0420024.2.

(Continued)

*Primary Examiner*—Vivek Srivastava
*Assistant Examiner*—Tanim Hossain
(74) *Attorney, Agent, or Firm*—Knobbe Martens Olson & Bear LLP

(57) ABSTRACT

A remote site filtering and monitoring system and method is described in which the Internet accesses of a remote device are monitored and categorized by a remote server in real-time. The system also provides for offline access logging and subsequent uploading, adjustable filtering sensitivities and particular HTTP port filtering.

60 Claims, 5 Drawing Sheets

U.S. PATENT DOCUMENTS

| | | | |
|---|---|---|---|
| 5,774,668 A | 6/1998 | Choquier | |
| 5,781,801 A | 7/1998 | Flanagan et al. | |
| 5,787,253 A | 7/1998 | McCreery et al. | |
| 5,787,427 A | 7/1998 | Benantar et al. | |
| 5,796,944 A | 8/1998 | Hill et al. | |
| 5,799,002 A | 8/1998 | Krishnan | |
| 5,801,747 A | 9/1998 | Bedard | |
| 5,826,014 A | 10/1998 | Coley et al. | |
| 5,828,833 A | 10/1998 | Belville et al. | 395/187.01 |
| 5,828,835 A | 10/1998 | Isfeld et al. | |
| 5,832,212 A | 11/1998 | Cragun et al. | |
| 5,832,228 A | 11/1998 | Holden et al. | |
| 5,832,503 A | 11/1998 | Malik et al. | |
| 5,835,722 A | 11/1998 | Bradshaw et al. | |
| 5,835,726 A | 11/1998 | Shwed et al. | |
| 5,842,040 A | 11/1998 | Hughes et al. | |
| 5,848,233 A | 12/1998 | Radia et al. | |
| 5,848,412 A | 12/1998 | Rowland et al. | |
| 5,850,523 A | 12/1998 | Gretta, Jr. | |
| 5,855,020 A | 12/1998 | Kirsch | |
| 5,864,683 A | 1/1999 | Boebert et al. | |
| 5,884,033 A | 3/1999 | Duvall et al. | 395/200.36 |
| 5,884,325 A | 3/1999 | Bauer et al. | |
| 5,889,958 A | 3/1999 | Willens | |
| 5,892,905 A | 4/1999 | Brandt et al. | |
| 5,896,502 A | 4/1999 | Shieh et al. | |
| 5,899,995 A | 5/1999 | Millier et al. | |
| 5,911,043 A | 6/1999 | Duffy et al. | |
| 5,937,404 A | 8/1999 | Csaszar et al. | |
| 5,941,947 A | 8/1999 | Brown et al. | |
| 5,944,794 A | 8/1999 | Okamoto et al. | |
| 5,950,195 A | 9/1999 | Stockwell et al. | |
| 5,958,015 A | 9/1999 | Dascalu | |
| 5,961,591 A | 10/1999 | Jones et al. | |
| 5,968,176 A | 10/1999 | Nessett et al. | |
| 5,978,807 A | 11/1999 | Mano et al. | |
| 5,983,270 A | 11/1999 | Abraham et al. | |
| 5,987,606 A | 11/1999 | Cirasole et al. | |
| 5,987,611 A | 11/1999 | Freund | |
| 5,991,807 A | 11/1999 | Schmidt et al. | |
| 5,996,011 A | 11/1999 | Humes | |
| 6,052,723 A | 4/2000 | Ginn | |
| 6,052,730 A | 4/2000 | Felciano et al. | |
| 6,055,564 A | 4/2000 | Phaal | |
| 6,065,056 A | 5/2000 | Bradshaw et al. | |
| 6,065,059 A | 5/2000 | Shieh et al. | |
| 6,070,242 A | 5/2000 | Wong et al. | |
| 6,073,239 A | 6/2000 | Dotan | |
| 6,085,241 A | 7/2000 | Otis | |
| 6,105,027 A | 8/2000 | Schneider et al. | 707/9 |
| 6,154,741 A | 11/2000 | Feldman | |
| 6,173,364 B1 | 1/2001 | Zenchelsky et al. | |
| 6,178,505 B1 | 1/2001 | Schneider et al. | |
| 6,182,118 B1 | 1/2001 | Finney et al. | |
| 6,219,667 B1 | 4/2001 | Lu et al. | |
| 6,219,786 B1 | 4/2001 | Cunningham et al. | 713/152 |
| 6,233,618 B1 | 5/2001 | Shannon | |
| 6,233,686 B1 | 5/2001 | Zenchelsky et al. | |
| 6,253,188 B1 | 6/2001 | Witek et al. | |
| 6,266,664 B1 | 7/2001 | Russell-Falla et al. | |
| 6,295,559 B1 | 9/2001 | Emens et al. | |
| 6,338,088 B1 | 1/2002 | Waters et al. | |
| 6,377,577 B1 | 4/2002 | Bechtolsheim et al. | |
| 6,418,433 B1 | 7/2002 | Chakrabarti et al. | |
| 6,446,119 B1 | 9/2002 | Olah et al. | |
| 6,456,306 B1 | 9/2002 | Chin et al. | |
| 6,460,141 B1 | 10/2002 | Olden | |
| 6,466,940 B1 | 10/2002 | Mills | |
| 6,486,892 B1 | 11/2002 | Stern | |
| 6,493,758 B1* | 12/2002 | McLain | 709/227 |
| 6,519,571 B1 | 2/2003 | Guheen et al. | |
| 6,571,249 B1 | 5/2003 | Garrecht et al. | |
| 6,606,659 B1 | 8/2003 | Hegli et al. | |
| 6,741,997 B1 | 5/2004 | Liu et al. | |
| 6,742,003 B2 | 5/2004 | Heckerman et al. | |
| 6,785,732 B1 | 8/2004 | Bates et al. | |
| 6,832,230 B1 | 12/2004 | Zilliacus et al. | |
| 6,832,256 B1 | 12/2004 | Toga | |
| 6,894,991 B2 | 5/2005 | Ayyagari et al. | |
| 6,947,935 B1 | 9/2005 | Horvitz et al. | |
| 6,978,292 B1 | 12/2005 | Murakami et al. | |
| 7,051,200 B1 | 5/2006 | Manferdelli et al. | |
| 7,093,293 B1 | 8/2006 | Smithson et al. | |
| 7,096,493 B1 | 8/2006 | Liu | |
| 7,185,015 B2 | 2/2007 | Kester et al. | |
| 7,197,713 B2 | 3/2007 | Stern | |
| 7,209,893 B2 | 4/2007 | Nii | |
| 7,213,069 B2 | 5/2007 | Anderson et al. | |
| 7,313,823 B2 | 12/2007 | Gao | |
| 7,359,372 B2 | 4/2008 | Pelletier et al. | |
| 7,376,154 B2 | 5/2008 | Ilnicki et al. | |
| 7,603,685 B2 | 10/2009 | Knudson et al. | |
| 7,603,687 B2 | 10/2009 | Pietraszak et al. | |
| 2001/0032258 A1 | 10/2001 | Ishida et al. | |
| 2001/0039582 A1 | 11/2001 | McKinnon et al. | |
| 2002/0042821 A1 | 4/2002 | Muret et al. | |
| 2002/0049883 A1 | 4/2002 | Schneider et al. | |
| 2002/0073089 A1 | 6/2002 | Schwartz et al. | |
| 2002/0087882 A1* | 7/2002 | Schneier et al. | 713/201 |
| 2002/0091947 A1* | 7/2002 | Nakamura | 713/202 |
| 2002/0103848 A1 | 8/2002 | Giacomini et al. | |
| 2002/0110084 A1 | 8/2002 | Butt et al. | |
| 2002/0129039 A1 | 9/2002 | Majewski et al. | |
| 2002/0129277 A1 | 9/2002 | Caccavale | |
| 2002/0133509 A1 | 9/2002 | Johnston et al. | |
| 2002/0144129 A1 | 10/2002 | Malivanchuk et al. | |
| 2002/0152284 A1 | 10/2002 | Cambray et al. | |
| 2002/0178374 A1 | 11/2002 | Swimmer et al. | |
| 2003/0005112 A1 | 1/2003 | Krautkremer | |
| 2003/0023860 A1 | 1/2003 | Eatough et al. | |
| 2003/0074567 A1 | 4/2003 | Charbonneau | |
| 2003/0093694 A1 | 5/2003 | Medvinsky et al. | |
| 2003/0105863 A1 | 6/2003 | Hegli et al. | 709/224 |
| 2003/0110168 A1 | 6/2003 | Kester et al. | |
| 2003/0121983 A1* | 7/2003 | Herle | 235/472.01 |
| 2003/0126136 A1 | 7/2003 | Omoigui | |
| 2003/0126139 A1 | 7/2003 | Lee et al. | |
| 2003/0135611 A1 | 7/2003 | Kemp et al. | 709/224 |
| 2003/0167257 A1 | 9/2003 | De Bonet | |
| 2003/0177187 A1 | 9/2003 | Levine et al. | |
| 2003/0182420 A1 | 9/2003 | Jones et al. | 709/225 |
| 2003/0185395 A1 | 10/2003 | Lee et al. | |
| 2003/0185399 A1 | 10/2003 | Ishiguro | |
| 2004/0003139 A1 | 1/2004 | Cottrille et al. | |
| 2004/0006621 A1 | 1/2004 | Bellinson et al. | 709/225 |
| 2004/0015586 A1 | 1/2004 | Hegli | 709/225 |
| 2004/0019656 A1 | 1/2004 | Smith | |
| 2004/0034794 A1 | 2/2004 | Mayer et al. | |
| 2004/0068479 A1 | 4/2004 | Wolfson et al. | |
| 2004/0078591 A1 | 4/2004 | Teixeira et al. | |
| 2004/0111499 A1 | 6/2004 | Dobrowski et al. | |
| 2004/0123157 A1 | 6/2004 | Alagna et al. | |
| 2004/0153644 A1 | 8/2004 | McCorkendale | |
| 2004/0181788 A1 | 9/2004 | Kester et al. | |
| 2004/0187029 A1* | 9/2004 | Ting | 713/201 |
| 2004/0220924 A1 | 11/2004 | Wootton | |
| 2005/0005165 A1* | 1/2005 | Morgan et al. | 713/201 |
| 2005/0033967 A1 | 2/2005 | Morino et al. | |
| 2005/0066197 A1 | 3/2005 | Hirata et al. | |
| 2005/0091535 A1 | 4/2005 | Kavalam et al. | |
| 2005/0131868 A1 | 6/2005 | Lin et al. | |
| 2005/0132184 A1 | 6/2005 | Palliyil et al. | |
| 2005/0138353 A1 | 6/2005 | Spies | |
| 2005/0155012 A1 | 7/2005 | Tayama et al. | |

| | | |
|---|---|---|
| 2005/0210035 A1 | 9/2005 | Kester et al. |
| 2005/0223001 A1 | 10/2005 | Kester et al. |
| 2005/0251862 A1 | 11/2005 | Talvitie |
| 2006/0004636 A1 | 1/2006 | Kester et al. |
| 2006/0026105 A1 | 2/2006 | Endoh |
| 2006/0031504 A1 | 2/2006 | Hegli et al. |
| 2006/0053488 A1 | 3/2006 | Sinclair et al. |
| 2006/0068755 A1 | 3/2006 | Shraim et al. |
| 2006/0075072 A1 | 4/2006 | Sinclair et al. |
| 2006/0095404 A1 | 5/2006 | Adelman et al. |
| 2006/0095459 A1 | 5/2006 | Adelman et al. |
| 2006/0095586 A1 | 5/2006 | Adelman et al. |
| 2006/0095965 A1 | 5/2006 | Phillips et al. |
| 2006/0101514 A1 | 5/2006 | Milener et al. |
| 2006/0129644 A1 | 6/2006 | Owen et al. |
| 2006/0265750 A1 | 11/2006 | Huddleston |
| 2007/0005762 A1 | 1/2007 | Knox et al. |
| 2007/0011739 A1 | 1/2007 | Zamir et al. |
| 2007/0028302 A1 | 2/2007 | Brennan et al. |
| 2007/0156833 A1 | 7/2007 | Nikolov et al. |
| 2008/0267144 A1 | 10/2008 | Jano et al. |
| 2008/0295177 A1 | 11/2008 | Dettinger et al. |

FOREIGN PATENT DOCUMENTS

| | | |
|---|---|---|
| EP | 0 748 095 | 12/1996 |
| EP | 0986229 | 3/2000 |
| EP | 1 074 916 | 2/2001 |
| EP | 1 180 889 | 2/2002 |
| EP | 1 278 330 | 1/2003 |
| EP | 1 280 040 | 1/2003 |
| EP | 1278136 | 1/2003 |
| EP | 1 318 468 | 6/2003 |
| EP | 1 329 117 | 7/2003 |
| EP | 1 318 468 | 11/2003 |
| EP | 1 457 885 | 9/2004 |
| EP | 1 494 409 | 1/2005 |
| EP | 1 510 945 | 3/2005 |
| GB | 2418330 | 3/2006 |
| GB | 2418999 | 4/2006 |
| JP | 10 243018 | 9/1998 |
| JP | 2000-235540 | 8/2000 |
| WO | WO 92/19054 | 10/1992 |
| WO | WO 96/05549 A1 | 2/1996 |
| WO | WO 96/42041 | 12/1996 |
| WO | WO 01/24012 | 4/2001 |
| WO | WO 01/31512 | 5/2001 |
| WO | WO 01/33371 | 5/2001 |
| WO | WO 01/55873 | 8/2001 |
| WO | WO 01/55905 A1 | 8/2001 |
| WO | WO 01/63835 | 8/2001 |
| WO | WO 2006/027590 | 3/2006 |
| WO | WO 2006/136605 | 12/2006 |

OTHER PUBLICATIONS

United Kingdom Search Report dated Jan. 6, 2005 for corresponding UK application GB0420025.9.
United Kingdom Search Report dated Jan. 31, 2005 for corresponding UK application GB0420023.4.
PCT International Search Report and Written Opinion dated Oct. 19, 2005 for corresponding Int'l. application PCT/GB2005/002961.
Surfcontrol "Project Nomad" Oct. 29, 2003; See: http://www.surfcontrol.com/news/newsitem.aspx?id=593.
United Kingdom Search Report dated Oct. 7, 2004 for application GB0417620.2 and Combined Search and Examination Report dated Oct. 8, 2004.
U.S. Appl. No. 10/195,847, filed May 8, 2003.
U.S. Appl. No. 10/662,270, filed Sep. 15, 2003.
C. L. Schuba and E. H. Spafford, Countering abuse of name-based authentication, Pub: In 22nd Annual Telecommunications Policy Research Conference, 1996, pp. 21.
Cohen, F., A Cryptographic Checksum for Integrity Protection, Computers & Security, Elsevier Science Publishers, Dec. 1, 1987, vol. 6, Issue 6, pp. 505-510, Amsterdam, NL.
European Search Report for Application No. 02258462.7, Jan. 30, 2006.
Forte, M. et al., "A content classification and filtering server for the Internet", Applied Computing 2006. 21st Annual ACM Symposium on Applied Computing, [online] http://portal.acm.org/citation.cfm?id=1141553&coll=portal&dl=ACM&CFID=2181828&CFTOKEN=68827537> [retrieved on Dec. 7, 2007], Apr. 23, 2006-Apr. 27, 2006, pp. 1166-1171.
Gittler F., et al., The DCE Security Service, Pub: Hewlett-Packard Journal, Dec. 1995, pp. 41-48.
IBM Technical Disclosure Bulletin, Mean to Protect System from Virus, IBM Corp., Aug. 1, 1994, Issue 659-660.
Igakura, Tomohiro et al., Specific quality measurement and control of the service-oriented networking application., Technical Report of IEICE, IEICE Association, Jan. 18, 2002, vol. 101, Issue 563, pp. 51-56, Japan.
International Search Report and Written Opinion dated Jun. 30, 2008 for PCT Patent Application No. PCT/US2007/024557.
International Search Report and Written Opinion for PCT Application No. PCT/US2007/015730 dated Dec. 27, 2008, 16 pages.
International Search Report, International Application No. PCT/US2006/049149, Mailed Mar. 10, 2008, 4 pages.
Microsoft Press Computer Dictionary, 3rd edition, Pub: Microsoft Press, 1997, pp. 262, 276.
Molitor, Andrew, An Architecture for Advanced Packet Filtering, Proceedings for the Fifth Usenix Unix Security Symposium, Jun. 1995, pp. 1-11.
Newman, H., A Look at Some Popular Filtering Systems, Pub: Internet, Online!, Jul. 25, 1999, pp. 1-11.
PCT International Search Report and Written Opinion for International Application No. PCT/US2008/052483., Feb. 11, 2009.
Roberts-Witt, S., The 1999 Utility Guide: Corporate Filtering, Pub: PC Magazine Online, Apr. 5, 1999, pp. 1-11.
Sandhu, et al., Access Control: Principles and Practice, IEEE Communications Magazine, Sep. 1994, pp. 40-48.
Secure Computing Corporation, SmartFilter™ Web Tool, Dec. 1, 1998, pp. 1-2.
Sequel Technology, Inc., Sequel and Surfwatch Partner to Provide Innovative Internet Resource Management Tools for Large Enterprises, Pub: Internet, Online!, Feb. 25, 1999, pp. 1-3.
Snyder, J., A Flurry of Firewalls, www.opus1.com/www/jms/nw-firewall.html, Network World, Jan. 29, 1996, pp. 1-8.
Supplementary European Search Report for EPO App. No. 00 90 7078, May 18, 2004.
SurfControl PLC, SuperScout Web Filter Reviewer's Guide, 2002, pp. 36.
SurfWatch Software, SurfWatch® Professional Edition: Product Overview, Pub: Internet, Online!, May 26, 1999, pp. 1.
Symantec Corporation, E-security begins with sound security policies, Announcement Symantec, XP002265695, Jun. 14, 2001, pp. 1,9.
Williams, R., Data Integrity with Veracity, Retrieved from the Internet: <URL: ftp://ftp.rocksoft.com/clients/rocksoft/papers/vercty10.ps>, Sep. 12, 1994.
Wobus, J., DHCP FAQ, www.nd.edu/~milind/FAQs/FAQ_dhcp, Dec. 29, 1995, pp. 1-10.
Yialelis, et al., Role-Based Security for Distributed Object Systems, Proceedings of the IEEE Fifty Workshops on Enabling Technology: Infrastructure for Collaborative Enterprises, WET ICE '96, Jun. 19, 1996-Jun. 21, 1996, pp. 6.

* cited by examiner

DEVICE INTERNET RESOURCE ACCESS FILTERING SYSTEM AND METHOD

PRIORITY CLAIM

This patent application claims priority under 35 USC 119 (a)-(d) from Great Britain Patent Application No. GB 0417620.2 filed on Aug. 7, 2004 and entitled "Device Internet Resource Access Filtering System and Method" which is incorporated herein in its entirety by reference.

APPENDIX

Attached hereto is Appendix A that forms part of the specification. Appendix A contains the user manual for an implementation of the internet filtering system and method in accordance with the invention.

FIELD OF THE INVENTION

The field of the invention relates generally to a filtering system and in particular to a computer-implemented device resource access filtering system and method.

BACKGROUND OF THE INVENTION

Systems and software that filter content/e-mails are well known. For example, well known fire-walls and proxy servers perform some of these functions in order to protect an internal computer network, such as a corporate intranet, from hackers, malicious viruses and worms. There are also well known systems that permit a firewall/proxy server to filter unauthorized Internet Access so that users do not receive those unwanted e-mail messages. Typically, these systems operate with a server that acts as a gateway to the corporate network. The server typically has some functionality (in software or hardware) that permits the server to perform filtering operations on incoming and outgoing Internet traffic. In some systems, a remote device may perform its own filtering, but it is then more difficult to enforce a corporate-wide acceptable usage policy (AUP) and the device needs additional processing power in order to filter its own resource accesses. Typically, a user of a computer or other device may access resources from a computer network wherein the resources may include e-mail messages, various different files from an FTP or WWW site, a posting from a newsgroup and the like. Thus, it is desirable to provide a system that filters a device's request for access to a resource from a computer network, such as the Internet. Thus, it is desirable to provide Internet filtering and a method that achieves these goals and it is to this end that the present invention is directed.

SUMMARY OF THE INVENTION

An Internet filtering system and method are provided that permit the monitoring and filtering of a resource access of a device using a remote server. The system enables a company to extend its corporate acceptable use policy beyond the wall of the office. In particular, the system permits the company to manage the Internet usage of mobile and remote employees and employees working from home. In a preferred embodiment, the system comprises a thin client installed on a monitored device that communicates with a server that monitors and filters Internet access resource requests. The system may reduce a company's legal liabilities since the company is more able to control the access to inappropriate Web sites during work times. The system may increase employee productivity as any Internet access during work time can be restricted to work-related Web sites. The system may also provide network security in that the system is able to protect against viruses and malicious content that might enter the work place through an employee using an external modem or Internet service provider.

The system may provide offline filtering functionality, unfiltered ports filtering functionality, differing filtering sensitivity levels and a monitoring capability. The offline functionality permits a client of a device, that loses its connection with the server of the filtering system, to continue to filter the resource accesses of the device. The client may then generate a log of those resource accesses that may be communicated back to the server once the client re-establishes a connection with the server. The unfiltered ports filtering functionality permits the system to specify a filtering strategy for TCP ports that are not specifically identified as filtered ports so that even the unfiltered ports may be filtered in some manner. The system permits an administrator to adjust the filtering sensitivity level for each client between a high sensitivity level, a medium sensitivity level, a low sensitivity level or an automatic sensitivity level. The filtering sensitivity level may be adjusted, for example, for a device with a slow Internet connection, such as a GPRS connection for a cellular phone. The system may provide the monitoring capability that permits the system to generate reports about the resource accesses of each device or of all of the devices connected to the server.

Thus, in accordance with the invention, an Internet access filtering system is provided. The system has a computer and a client on a device wherein the client establishes a connection to the computer. The client has a module that gathers information about a request to access a resource by the device and a module that communicates the gathered information to the computer. The computer has a module that categorizes the resource access of the device based on the gathered information and a module that communicates, in real-time, a resource access decision to the client so that the client controls the access to the resource by the device based on the resource access decision of the computer.

In accordance with another aspect of the invention, an Internet access filtering system is provided that has a computer and a client on a device wherein the client establishes a connection to the computer. The client has means for gathering information about a request to access a resource by the device and means for communicating the gathered information to the computer. The computer has means for categorizing the resource access of the device based on the gathered information and means for communicating, in real-time, a resource access decision to the client so that the client controls the access to the resource by the device based on the resource access decision of the computer.

In accordance with another aspect of the invention, an Internet access filtering method using a computer and a client on a device that establishes a connection to the computer is provided. The client may gather information about a request to access a resource by the device and that gathered information is communicated to the computer. The computer may then categorize the resource access of the device based on the gathered information and communicate, in real-time, a resource access decision to the client so that the client controls the access to the resource by the device based on the resource access decision of the computer.

In accordance with another aspect of the invention, a server for an Internet access filtering system is provided. The server has a module that receives information about a request to access a resource by a remote device wherein the information about the resource access request is communicated from the remote client on the device. The server also has a module that categorizes the resource access of the device based on the gathered information and a module that communicates, in real-time, a resource access decision to the client so that the client controls the access to the resource by the device based on the resource access decision of the computer.

In accordance with yet another aspect of the invention, an Internet access filtering client located on a device that communicates with a remote computer is provided. The client has a module that gathers information about a request to access a resource by the device and a module that communicates the gathered information to the computer. The client also has a module that receives a resource access decision from the remote computer and controls the access to the resource by the device based on the resource access decision of the computer.

DETAILED DESCRIPTION OF A PREFERRED EMBODIMENT

The invention is particularly applicable to a client/server based computer-implemented, software-based device resource access filtering and monitoring system and it is in this context that the invention will be described. It will be appreciated, however, that the system and method in accordance with the invention has greater utility since the system may be implemented using various different computer architectures and may be implemented with a variety of different remote devices, such as wireless devices, cellular telephone devices, wireless e-mail devices, wireless personal digital assistant devices, such as a Palm device, a Treo device, a RIM Blackberry device, a wired personal computer, a wired laptop computer or a wirelessly connected computing device. In fact, the system may be implemented using any computing device wherein the computing device has at least a processor, memory and an input/output device with sufficient computing power so that the computing device is capable of interacting with the system and performing the fundamental filtering functions described herein, since each client is not necessarily able to perform all of the functions described below. The different capabilities of each device are communicated to the system using a capability mask that is described below in more detail. The system may be implemented in software or hardware. In the software embodiment, the system may comprises one or more software modules in the server and one or more modules in the client wherein each module may further comprise a plurality of lines of computer code that are executed by the processor of the server or client. Now, an embodiment of the remote device monitoring system will be described.

Figure 1:
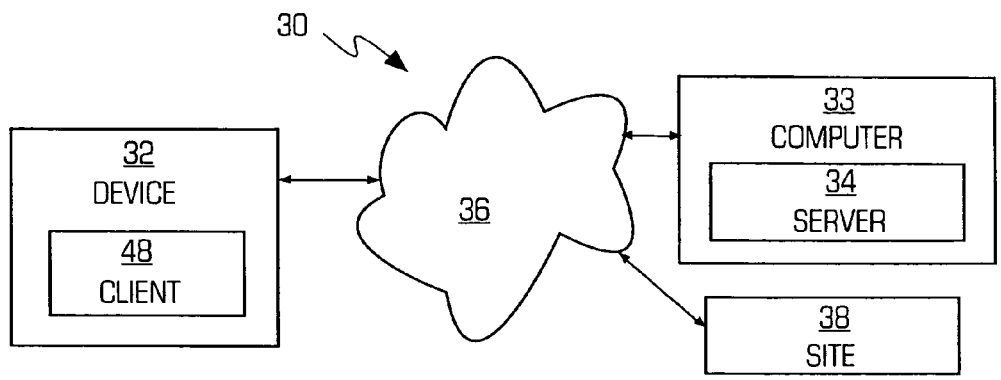
FIG. 1 is a diagram illustrating an example of a device resource access filtering and monitoring system in accordance with the invention.

FIG. 1 is a diagram illustrating an example of a device resource access filtering and monitoring system 30 in accordance with the invention. The system 30 permits a device 32 (with a piece of software code known as a client 48) that connects to a remote computer device 33, such as a computer with server software 34 in this embodiment, over a computer network 36, such as the Internet in this embodiment, a wide area network (WAN), local area network (LAN), metropolitan area network (MAN) or the World Wide Web, to be monitored and the device's access to resources on a site 38 to be monitored and filtered. The site 38 is the source of a resource requested by the user of the device 32. In more detail, the server 34 is able to filter and/or analyze the device's access to resources on the Internet remotely. In accordance with the invention, the functionality to achieve this remote monitoring of the device 32 is split between the device 32 and the server 34 in order to reduce the network traffic between the device 32 and the server 34 and permit the controlling and monitoring of the access to various resources including e-mails, web pages, file transfer protocol (FTP) sites, newsgroups and the like. In accordance with the invention, the server 34 may also receive the data associated with the attempted access of the resources to determine if the device will be permitted to receive the content, download the data, etc. from the address associated with the access request to the site 38. The device and server may communicate with each other using a particular protocol that is based on a proprietary protocol. The system provides for the real-time filtering of computer network access whereby the remote computer 33, such as the server 34 in the preferred embodiment, is utilized to make and/or adjust the filtering decisions.

The protocol for the system, since the client 48 is expected to work on and in a variety of remote networks (over which the corporation may have little or no control), is compatible as possible with those remote networks so that the client 48 may operate over those remote networks. For example, the protocol is compatible with Firewalls and Proxies. The protocol handles and accommodates various different devices with different data formats and capabilities so that the protocol provides a standard data format for strings and numbers for the different devices. The protocol also is compact in size as the server may be required to handle a large number of clients using limited bandwidth and a client may have to utilize a slow internet connection to the server. In accordance with a preferred embodiment of the invention, the protocol utilizes, to increase compatibility with a wide variety of networks, hypertext transfer protocol (HTTP) over TCP port 80 using an HTTP envelope. For those networks that permit access to the Internet, the most basic access is Web access which will involve outgoing connection requests over port 80 so that port 80 is typically available and used for this protocol. Some networks only permit Internet Web access via a proxy server that expect an HTTP style request and response so that the HTTP protocol is used for this system. Furthermore, some firewalls may examine Internet accesses and raise alerts when port 80 is being used for protocols other than HTTP so that the system's protocol uses HTTP.

In accordance with the invention, the HTTP protocol may be used by the system for requests by the client 48 as well as responses from the server 34 back to the client. As with HTTP, only the client 48 can instigate a communication and it does this by performing a well known HTTP POST to identify which operation the client is requesting along with any parameter data. An example of the format of this request is:

POST http://[Nomad_Module_Path]?[Operation_Code] HTTP/1.1\r\n
Host: [Host]\r\n

-continued

```
Content-Length: [Size_of_Encoded_Data]\r\n
Content-Type: application/x-www-form-urlencoded\r\n\r\n
[Encoded_Data]
```

For a response from the server to the client, the protocol again mimics the HTTP protocol so our returned data appears to be a Web Page. An example of the format of this response is:

```
Content-Type: text/html\r\n
<html><head><title>
SMF
</title></head><body>
[Encoded_Data]
</body></html>
```

The operation codes for the protocol (See [Operation_Code] variable in the request format example above) specify the various operations that may be requested using the system protocol.

Returning to FIG. 1, the device 32 may be any computing device that has sufficient computing resources to perform the filtering functions specified below so that the device 32 must have at least a processor, some memory and some mechanism for accessing resources from a computer network. For example, the device 32 may be a cellular phone, a personal digital assistant, a personal computer, a laptop computer, a palmtop computer, or an appliance with the sufficient computing resources to accomplish computer network access and the like. Thus, the device may include wireless devices, cellular telephone devices, wireless e-mail devices, wireless personal digital assistant devices, such as a Palm device, a Treo device, a RIM Blackberry device, a wired personal computer, a wired laptop computer or a wirelessly connected computing device. In accordance with the invention, the system may perform various filtering functions and each device does not necessarily have to be able to support all of the filtering features described herein. For example, a cellular phone is unlikely to have sufficient memory to store a list of encrypted URLs required for the Offline mode of "Allow and Log." Thus, it is desirable to alert the system to the filtering capabilities of each device that is going to perform filtering. In accordance with the invention, a capability mask may be used for this purpose. In particular, when a device logs into the system, it may communicate a capability mask for the device to the server that informs the server of the functionality that the device can and/or cannot offer based on the particular device and its characteristics.

The site 38 may store any resource that can be accessed over a computer network, such as an e-mail, downloaded data (PDF files, text files, word documents, HTML files, zip files and the like), an FTP site or a TELNET server. The invention is not limited to any particular architecture of the system (and the relationships of the computers within the system) although a client/server architecture is shown for illustration purposes. For example, the system may be implemented using a peer-to-peer architecture in which the remote computer 34 functionality is distributed. Furthermore, the invention is not limited to any particular type of resource as the system may be configured to handle any type of resource or any new resource or type of resource.

Figure 2:
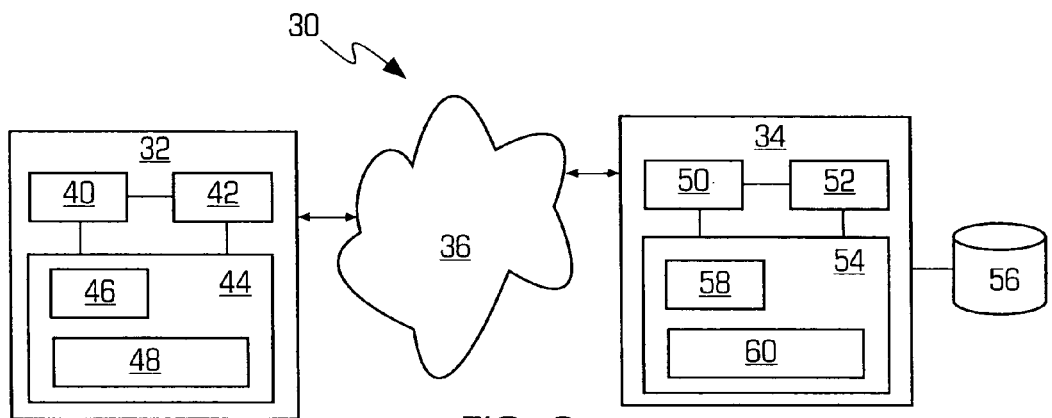
FIG. 2 is a diagram illustrating more details of the device resource access filtering and monitoring system shown in FIG. 1.

FIG. 2 is a diagram illustrating more details of an example of the system 30 shown in FIG. 1. In this example, the device 32 may be a personal computer that is capable of access to resources at the site 38 (See FIG. 1) and is being monitored by the computer 34 which is a typical server computer in this example. The device may comprise one or more processors 40, a persistent storage device 42 and a memory 44 that are interconnected to each other in a well known manner. The persistent storage device may comprise, for example, non-volatile memory such as flash memory, a hard disk drive, a writeable optical drive, a removable media drive or another storage mechanism that permits storage of data and instructions while the device 32 is powered down. The memory 44 may be, for example, SRAM, DRAM or another structure that temporarily stores data and instructions being executed by the processor(s) 40 while the device is powered up. The device 32 may further comprise some mechanism (not shown) for accessing the site 38 and server 34, such as a wired connection (such as a cable modem and cable for example) or a wireless connection (such as a 802.11 link, a cellular link or GPRS link). The device 32 may further comprise an operating system 46 that resides in the memory 44 during operation of the device and is executed by the processor(s) 40 as is well known. The invention is not limited to any particular type of operating system and may be implemented with various different operating systems. In order to implement the filtering and monitoring system in accordance with the invention, the device 32 may further include a client 48 (which is shown as a software application/software module containing a plurality of lines of computer instructions and data in this example) that is stored in the memory 44 and executed by the processor(s) 40 to perform the client functions of the filtering system as described below in more detail. In the preferred embodiment of the invention, the client further comprises one or more software modules having a plurality of lines of computer code wherein each module performs different functions of the filtering system and the combination of the modules implements the client functions. The client 48 may also be implemented as a mixed hardware/software device, such as a plug-in media card that is plugged into the device 32, or as a hardware device, such as an ASIC with the client embedded into the ASIC. When the user of the device 32 attempts to access a remote resource, such as a resource on the site 38 shown in FIG. 1, the client 48 intercepts the access and gathers data about the access that is then forwarded to the server 34 in one embodiment of the invention. The client 48 may also gather the data about the resource access and then make a determination about the access request itself in another embodiment of the invention. The level of access for each user (and/or each device) may be customized for a particular user.

The server 34 may further comprise one or more processor(s) 50, a persistent storage device 52 and a memory 54 that are interconnected together as is well known. The server may further comprise a database 56 that stores the data and software code associated with the filtering system in accordance with the invention. The server may further comprise an operating system 58 as is well known and a filtering/categorization module 60, shown as a piece of software residing in the memory 54 in this example, that processes the resource access requests and determines whether or not the device 32 may access the resource on the site 38 in one embodiment of the invention. The module 60 (which preferably comprises one or more software modules) implements different functions of the filtering system including administrative functions associated with the filtering system and may interact with the database 56 to request and store data in the database associated with the filtering activities. To uniquely identify each device 32, each device is assigned a unique identifier that ties the configuration and filtering requests to a particular device and permits the filtering logs for a particular device to be stored in the database. In addition, the combination of the unique identifier with an initial log-in by each device 32 to the server reduces the amount of data being transmitted between the device 32 and computer 34 during each resource access request when the server 34 is performing the filtering decisions. In this embodiment of the invention, the filtering system permits the filtering of access by a device to a remote resource in real-time wherein a server is used to accomplish the filtering decisions. In another embodiment of the invention, the device may perform it's own filtering decisions, such as when the server is unavailable to the device, where the client operates in a mode specified by the server, such as for example, the client logs the accesses and then uploads a log to the server when connectivity is re-established.

Figure 3:
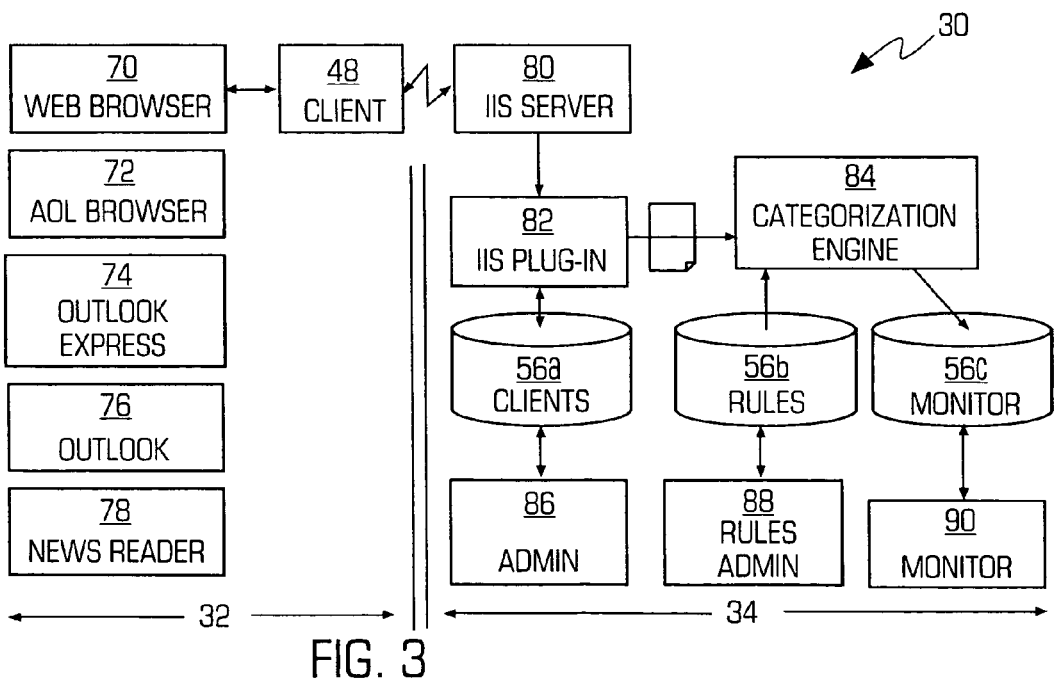
FIG. 3 is a diagram illustrating further details of a client/server embodiment of the device resource access filtering and monitoring system showing more details of the device and the server.

FIG. 3 is a diagram illustrating further details of a client/server embodiment of the device resource access filtering and monitoring system showing more details of the device 32 and the server 34. In this example, the device 32 may include one or more typical software applications that might be used on a typical personal computer, such as a web browser 70, an AOL browser 72, Outlook Express 74, Outlook 76, an FTP client (not shown), a Gopher client (not shown) and/or a news reader 78. When using any of these typical software applications that attempts to access a remote resource, the information about the remote resource access is intercepted by the client 48 so that it can be sent to the server 34 to determine if access to the particular resource should be permitted for the particular device. In one embodiment, on the server 34 side, the server further comprises a Microsoft's Internet Information Server (IIS) 80 that receives the data from the client 48 on the device 32. The invention is not limited to using the IIS and may be implemented in other manners. The IIS server 80 may then forward that information onto an IIS plug-in 82 that forwards the data onto a categorization engine 84. The IIS plug-in 82 may determine a particular client associated with the device 32 using a client database 56a (part of the database 56 shown in FIG. 2 in a preferred embodiment or a separate database) wherein the client database may be maintained using an administration module 86. The administration module may contain, for example, a list of all monitored clients that are installed on remote devices along with the settings for each client that may be stored in the client database 56a as described in more detail with reference to FIG. 7.

The IIS Plug-in 82 may further comprise an offline filtering module, an unfiltered ports module and a filtering sensitivity module. The categorization may then communicate the offline mode, unfiltered ports mode and filtering sensitivity settings for a particular client to the client which then implements the offline filtering, unfiltered ports filtering and filtering sensitivity levels. The client may comprise an offline filtering module, an unfiltered ports module and a filtering sensitivity module wherein each module implements the respective functions of the client and each module may be implemented as a plurality of lines of computer code that are executed by the processor of the device on which the client resides.

The categorization engine 84 may pull categorization rules from a rules database 56b (part of the database 56 in FIG. 2 in a preferred embodiment or a separate database) that is maintained by a rules administration module 88. The rules administration module 88 may also be used to create a new rule as described in more detail below with reference to FIG. 8. The categorization engine may store its results in a monitor database 56c (part of the database 56 in FIG. 2 in a preferred embodiment or a separate database) that is maintained by a monitor module 90. The monitor module 90 may, for example, collect and display information about the Web surfing habits of each client or of all of the clients. The monitor module 90 may also include a real-time monitor module (not shown) that permits a user of the monitoring system to show the Internet connections for remote user of the devices as the connections are requested. In accordance with the invention, the categorization engine may categorize a particular information request based upon one or more pieces of data. The information request may be categorized primarily based on the site address to be accessed by the device. The categorization engine may also use 1) the device's host name or a server-side configurable alternative name (when the device does not have a host name); and/or 2) the device's current user name or a server-side configurable alternative name (for devices that do not have a user name). Thus, the categorization criteria (and therefore the accessible remote sites) for a particular device/user is configurable. For example, the level of access may change depending on the employee seniority or status within the company. An administrator module (not shown) may include a scheduler that permits the user to set-up events to occur automatically on the server, such as database updates, database maintenance tasks and the like. The administrator module also permits a user to categorize/re-categorize a site. A virtual control agent (not shown) is an optional module that uses artificial intelligence to automatically visit and categorize sites that have been accessed by the user, that at that time, did not have a category. The administrator module also has a web reporting module so that the system can generate reports on the client data and the surfing habits. The various modules of the remote computer 34 may each be a piece of software with a plurality of lines of code that implements the functions described herein.

Figure 4:
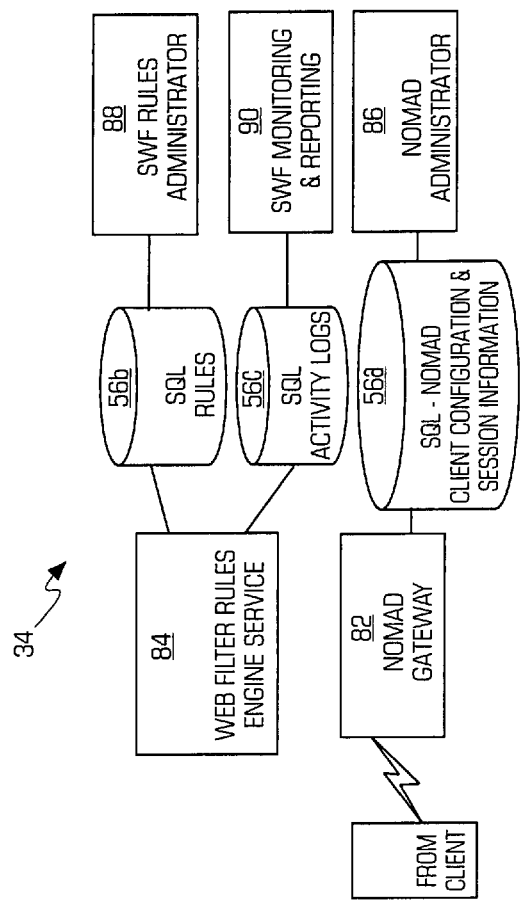
FIG. 4 is a diagram illustrating more details of the server portion of the system of FIG. 3.
Figure 5:
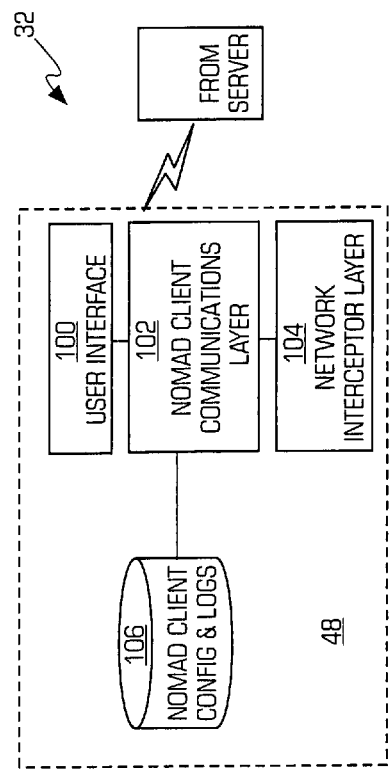
FIG. 5 is a diagram illustrating more details of the client portion of the system of FIG. 3.

FIG. 4 is a diagram illustrating more details of the server portion 34 of the device client/server embodiment of the invention and FIG. 5 is a diagram illustrating more details of the device 32 portion of the device client/server embodiment of the invention. As shown in FIG. 4, an implementation of the server 34 is shown wherein an SQL database is used to store the data for the system and a web filter rules engine service is used that is available as part of the SurfControl Web Filter product. An example of a filtering rule in accordance with the invention and how a rule is created is described in more detail below with reference to FIG. 8. As shown in FIG. 5, the client 48 on the device further comprises a user interface portion 100, a client communications layer 102, a network interceptor layer 104 and a storage medium 106 that stores the configurations for the particular client 48 as well as any log files as described below. In a preferred embodiment, each of these portions and layers is a piece of software being executed by the processor of the device. The user interface portion 100 generates the user interface of the monitoring system that is displayed to the user and may include configuration user interface screens. The network interceptor layer 104 may gather the data from a resource access request to an external site while the client communications layer 102 may format that data into a format to send to the server 34 and receive the server's resource access decision and implements that decision.

During normal operation of the system in accordance with the invention, the device may initiate a resource access request to a resource on a remote site, such as a web page from Amazon.com, and the client 48 captures the data associated with that request, such as the site address. The client may also gather the device identifier and other device data and then forward the resource access request data to the server 34. The server may then, based on the resource access request data, make a categorization/filtering decision to generate a resource access decision and then send the resource access decision back to the client 48 so that the client may take the appropriate actions. Thus, the remote server may perform real-time monitoring and filtering of the resource access requests of the device 32. If, however, the server 34 is not available to the device (for any reason), then the device may perform offline filtering wherein the device 32 is responsible for its own monitoring and filtering. When the device (and hence the client) is unable to connect to the server, it will attempt reconnection on a regular basis, such as every 5 minutes, while the client is connected to the Internet.

During the offline filtering, the device/client may operate in different modes of operation depending on the configuration of the particular client by the server. For example, the client 48 may permit all Internet accesses, but log each resource access request into a local log file (a "Log & Allow" mode) that may then be later uploaded to the server. Alternatively, the client may block all Internet access (a "Block All" mode) or allow all Internet access with no logging (an "Allow All" mode). In accordance with the invention, the offline logs recorded on the client may be stored in the local storage of the device, such as the memory or persistent storage device as described above. If the log is later uploaded to the server, the log file may then be deleted on the device. In a preferred embodiment, the log file may be encrypted. The log file may further include some basic monitoring capabilities to detect unauthorized tampering of the client. In accordance with the invention, the offline log uploading may include bandwidth throttling so that when the server comes back online, it is not overloaded by numerous clients all trying to upload their logs to the server.

In accordance with the invention, the server may include the administrator module 86 that permits a system administrator, such as a Chief Information Officer for a corporation, or the client itself (using an automated algorithm) to adjust the operation of the filtering and monitoring system in accordance with the invention. For example, the filtering sensitivity of the system (the level at which Internet accesses are filtered on a particular device) for each device may be customized/adjusted so that the amount of Internet traffic being filtered may be reduced for a particular device which reduces the amount of bandwidth of the device dedicated to the monitoring and filtering operations. For example, a device with a slow Internet connection, such as GPRS for a cellular phone, may have its sensitivity adjusted. In accordance with the invention, the filtering sensitivity for any device may be adjusted based on any particular characteristics of the device. In a preferred embodiment of the system, there may be a high filtering level, a medium filtering level, a low filtering level and an automatic filtering level. At the high filtering sensitivity level, the system may, for example, filter all non-hypertext transfer protocol (HTTP) ports and all HTTP requests so that this setting filters all resources including, for example, pop-up ads. The high filtering sensitivity provides a very thorough filtering, but may impact filtering speed and performance if the device is making a lot of resource access requests. At the medium level of sensitivity, all non-HTTP ports are categorized, but only HTTP page requests are categorized while image files, sound files, style sheets and XML requests are not categorized. At a low sensitivity level, all non-HTTP ports are categorized, but only the server address part of the HTTP request is categorized and the results may be cached for a very short time. At the automatic level of sensitivity, the client chooses the high, medium or low level based on the average server response times (response latency) and pre-configured thresholds. For the automatic mode, the client may include a piece of code that adjusts the sensitivity. For example, the high level may be used while the response latency is less than a predetermined period of time and then be reset to a medium level.

In accordance with the invention, the system may filter all TCP/IP ports wherein some of the ports are treated as HTTP web requests either made directly to the resource at the site 38 or via a Proxy Server. In order to reduce needless communications with the server for device access to ports that a particular company is not interested in filtering or monitoring, the device 32 may be informed (by the server) of which ports are to be communicated to the server and which of those ports are to be treated as HTTP web requests. Thus, the server may be configured, for a particular company, with unfiltered ports (the list of ports that are not to be communicated to the server.) In accordance with the invention, the list of ports to filter and/or treat as HTTP requests are communicated to the device during the login procedure of the device. The client may then perform an unfiltered port action which is an automatic action taken when an application executing on the device attempts to access an unfiltered port. In a current implementation and one embodiment of the system, the list of filtering ports and HTTP ports are hard coded into the server software. In another embodiment of the invention, the server may analyze a set/list of rules (which may be adjusted/customized) and the list of monitored ports is automatically generated from the rules. The unfiltered port actions may include, for example, an allow all option in which all of these port requests are allowed (an "Allow All" mode), a block all option (a "Block All" mode) is which access to all unfiltered ports is blocked and a filter option (a "Filter" mode) in which the port request is communicated to the server which is useful for rules that in a typical Web filter usually affects all ports, such as block everyone from adult content.

Figure 6A:
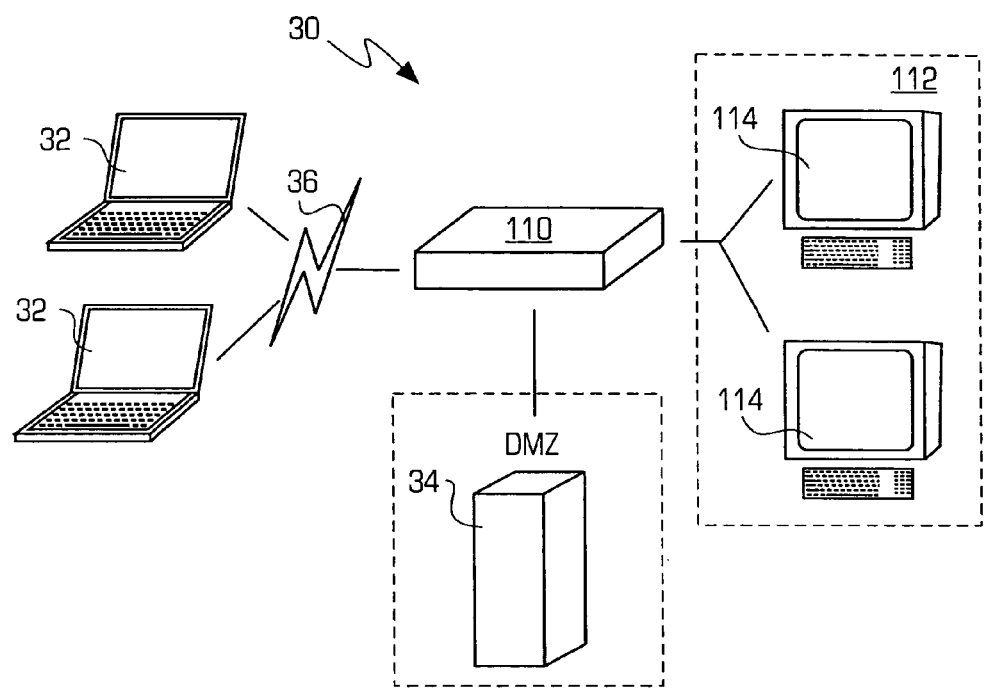
FIGS. 6A and 6B illustrate two different examples of an installation of the device resource access filtering and monitoring system in accordance with the invention.
Figure 6B:
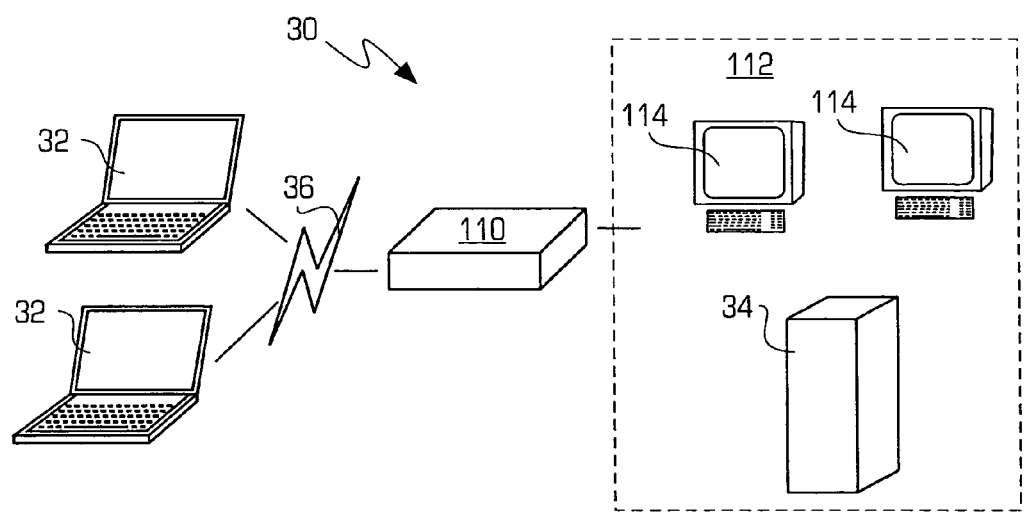

FIGS. 6A and 6B are two different examples of an installation of the filtering system in accordance with the invention. For each installation, the server 34 is positioned so that the devices 32 (with the clients) may access the server over TCP port 80. In FIG. 6A, the server 34 may be positioned external to a main protected network 112 (with its internal computing devices 114) and connected to the corporate network via bridge/router/firewall device 110 as shown so that the devices 32 may access the server 34. In the example shown in FIG. 6B, the server 34 may be located within the network 112 and then the firewall 110 must be configured to allow traffic on TCP port 80 as long as the traffic is directed to server 34. In both cases, the device 32 are able to communicate with the server 34 and therefore the server can perform the remote monitoring and filtering operations.

Figure 7:
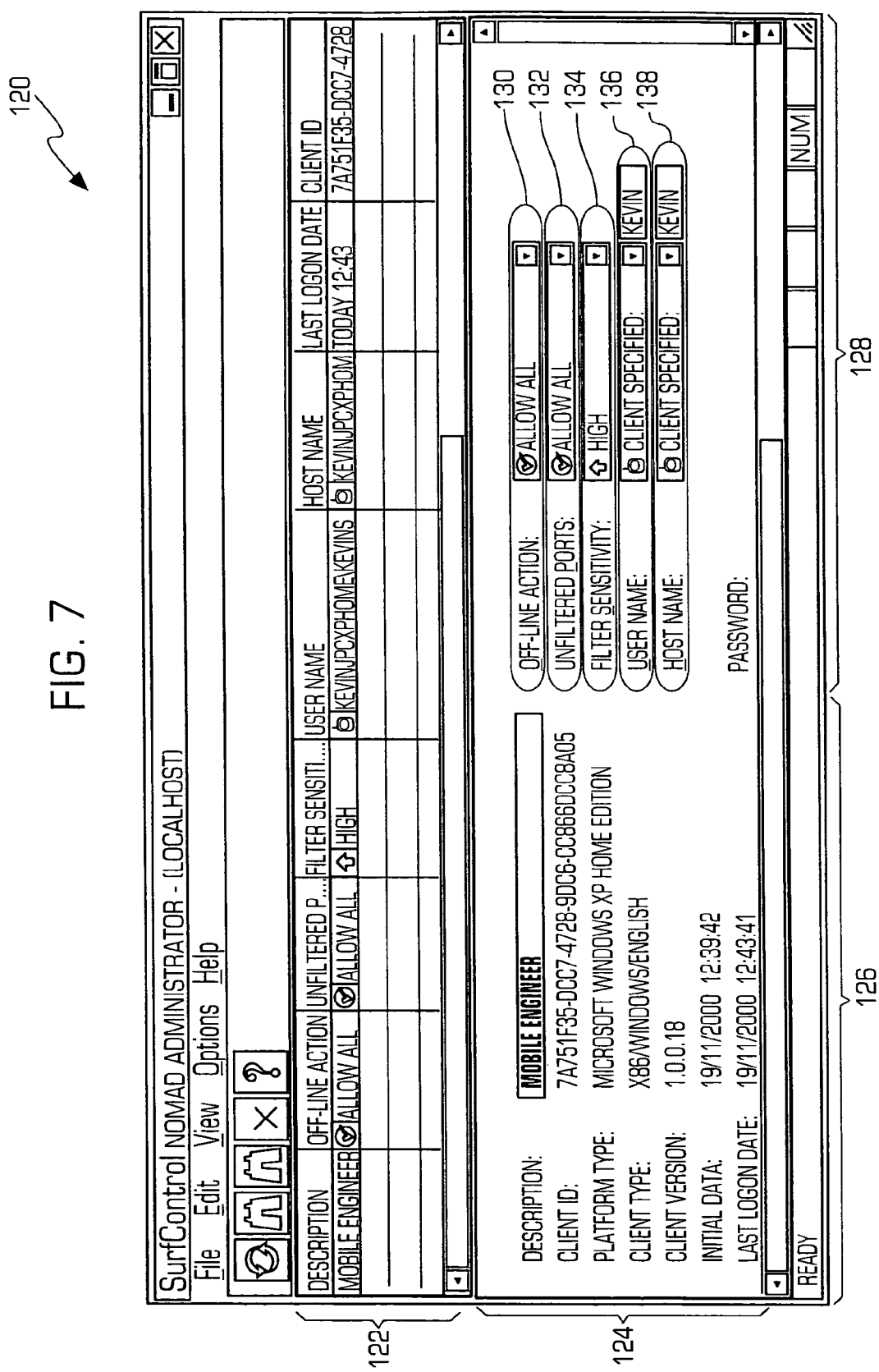
FIG. 7 illustrates an example of the user interface for an exemplary implementation of the client administrator module of the system.

FIG. 7 illustrates an example of the user interface 120 for an exemplary implementation of the client administrator module. The administrator is the main management point for the system and provides a customizable description of each remote device and the settings for each particular device. The user interface 120 includes a summary portion 122 and a client detail portion 124 wherein the summary portion 122 lists all of the clients currently entered into or logged into the system (only one is shown in this example for simplicity.) When the user of the administrator module selects a particular client from the summary portion, the client detail portion 124 shows the detailed settings and other information for the particular client and the device on which the client is being executed. The client detail portion 124 may further include a client information portion 126 and a client settings portion 128 wherein the client information portion lists information about the particular selected client/device and the client settings portion permits the administrator to adjust/set/reset the settings of the filtering/monitoring for the particular client/device. As shown in the client information portion, each client has a unique identification (the Client Id shown in FIG. 7) that uniquely identifies each client installation so that the settings for each client may be stored in the database.

In the client settings portion 128, the administrator may set various filtering and monitoring settings including, for example, an offline action setting 130, an unfiltered ports setting 132, a filter sensitivity setting 134, a user name setting 136 and a host name setting 138. As described above, the offline action setting 130 permits the administrator to select an option of how the client will operate when the server becomes unavailable to the client and the offline actions, in a preferred embodiment, may be selected from "Allow All", "Block All" or "Log and Allow". The unfiltered ports setting 132 permits the administrator to set how the particular client should behave when ports not included in the filtered ports are accessed by the user of the device. In a preferred embodiment of the invention, a selected list of TCP ports are chosen to be monitored in order to reduce the total traffic between the client and the server. The actual selection of ports being monitored may be modified using the administrator modules. The list of default TCP ports may include, for example:

| PORT | APPLICATION | NUMBER |
|------|-------------|--------|
| HTTP | Web traffic | 80, 8000, 8080 |
| HTTPS | Secure web traffic | 443 |
| FTP | File transfers | 21 |
| NNTP | Newsgroups | 119 |
| POP3 | E-mail (receiving) | 110 |
| SMTP | E-mail (sending) | 25 |
| AOL | American Online | 11523 |

Thus, for any port not specified as filtered or added into the monitored ports by the administrator, the unfiltered ports setting will apply. As described above, the unfiltered port selections, in a preferred embodiment, may include the Allow All, Block All and Filter modes. The filter sensitivity setting 134 permits the administrator to set the level of sensitivity of the filtering for the client. As described above, the selections may include, in a preferred embodiment, a high filtering level, a medium filtering level, a low filtering level and an automatic filtering level.

In general, the filtering rules may be based on a user name or host name. Thus, if a user name is specified by a rule, then regardless of the device being used by the user, the user filtering rules are applied. If a host name is specified in a rule, then regardless of which user logs into a particular device, the rules based on the host name are applied to that particular device. Thus, the user name setting 136 permits the administrator to set the user that is applied to the particular device. This user name is used by the server for all filtering decisions for the client device. The name can then be used to check against the rules in the rules database to determine the appropriate filtering for the particular client user. The user name setting permits the administrator to choose, in the preferred embodiment, from a client specified name mode, a server override mode or a server default mode. In the client specified mode, when the user logs into the device executing the client, the client sends the user log in name to the server which is used as the user name. In the server override mode, the administrator can specify a name to identify this user as a member of an organization, such as engineering, secretary, mobile employee, etc. . . . , without specifically defining the user as an individual so that the filtering rules for the organization will apply to the particular user. For example, a company may have a collection of mobile devices used for traveling insurance salesmen, and anyone using those mobile devices should be filtered according to the role of 'salesman', rather than their individual user name. Therefore rules can be created that allow 'salesman' to go to particular sites needed for the job. This mode may also be used when the client is unable to supply a user name, such as a mobile phone. The server default mode is used when the client specified mode and server override mode are not used so that the device may still be filtered at some level. The host name setting 138 specifies the actual device (in contrast to a user of the device) so that devices or groups of devices (with particular characteristics) can be grouped together, recognized and filtered according to the filtering rules for that group of devices regardless of the individual using the device. The host name settings permits the administrator to select, in a preferred embodiment, from a client specified host name mode, a server override mode and a server default mode. In the client specified mode, the client of a device, when the user logs into the device, provides the network name of the device to the server. In the server override mode, the host name is used to identify the device as a member of a group which is useful for devices, such as a mobile phone, that cannot supply a host name. In the server default mode, this is the host name used when the client specified mode and server override mode are not used so that the device may still be filtered at some level.

Figure 8:
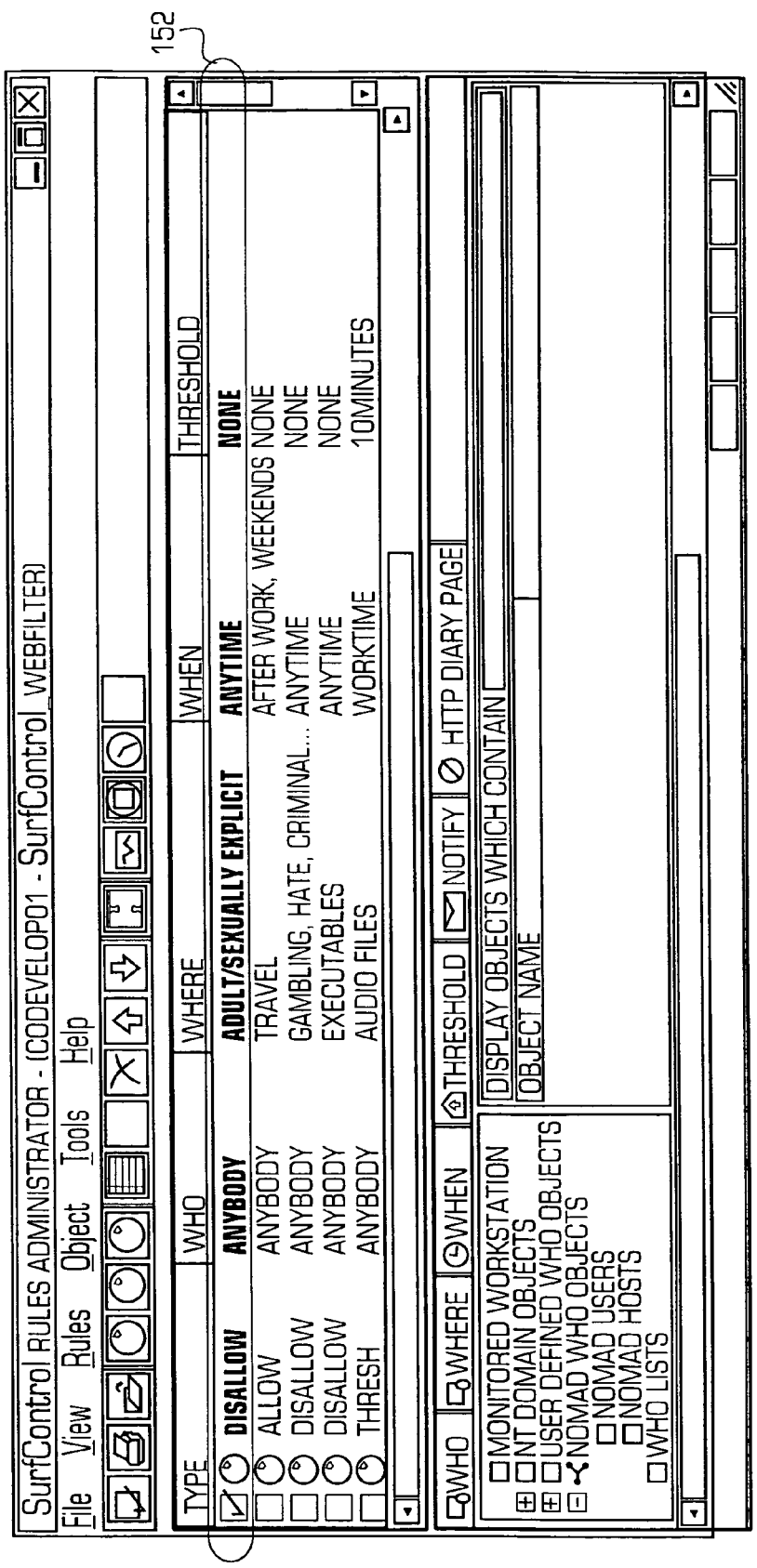
FIG. 8 illustrates an example of the user interface for an implementation of the rules administrator module of the system.

FIG. 8 illustrates an example of the user interface 150 for an implementation of the rules administrator module. The rules administrator permits an authorized user of the system to create one or more filtering rules. The user interface shows each rule 152 as a row in the display with the different characteristics/settings of each rule, such as the type of rule, the user/device to which the rule applies, the type of content to which the rule applies, the threshold for the rule and the notification characteristics of the rule arranged in different columns of the display. The types of rules include ALLOW (allow the content specified by the rule), DISALLOW (do not allow the content specified by the rule) or THRESHOLD (allow the content specified by the rule if it is within the threshold values). For the threshold rules, a user specified by the rule may be permitted to access the Internet for a set period of time, for example. For each rule, the administrator may specify the clients/devices or groups of clients or devices to which the rule is applied during filtering operations. For each rule, the administrator may specify the type of content to be filtered. For example, as shown in FIG. 8, the content may be adult/sexually explicit, travel, gambling, executables, etc. although a rule may be created to filter any type of content and any type of content may be added into the system so that a new type of content may be filtered in the future. Each rule also specifies the time during which the rule is applied, such as ANYTIME, After Work and Weekends, Worktime, etc. wherein different time periods may be given a new name and then the time period specified by the user. Each rule may also have a threshold as described above as well as a notification characteristic that specifies who in the system is notified when certain content is being accessed by a user.

In accordance with the invention, the filtering rules generated by the rules administrator may govern who can access what areas of the Internet at what time of day. The rules may be positive (allowing access to sites, a category of sites such as "sexually explicit" or resources) or negative (denying access to sites, a category of sites or resources). In general, each rule may contain a Type, Who, Where, When, Notify, Threshold and HTTP Deny objects (only some of which are shown in FIG. 8) that specify different characteristics of each filtering rule. The Type object contains data that specifies when the rule is allow, disallow or threshold rule. The Who object contains data that specifies the individual to which the rule will be applied wherein the object may specify an individual, a group of people, anybody, nobody, etc. . . . The Where object contains data that specifies the origin (such as a web site) of the requested resource, but may also specify a category of sites, such as "Sexually explicit" or "ftp" for example. The When object contains data that specifies the time and/or days when the resource request is permitted or denied. The Notify object contains data that specifies one or more individuals that might be notified, such as by email, when a particular resource request triggers that rule. The Threshold object contains data that specifies the limit of the amount of data or the time spent surfing during a particular time period. The HTTP Deny object contains data that specifies that a particular type of deny page (harsh, strong or mild) is sent to the user when the rule is triggered. For each new rule, the rules administrator permits the user to specify these characteristics of the rule by entering information and utilizing drop down menus.

In accordance with the invention, the system filters devices remote from the corporate network. It is desirable that, when a particular device transitions back onto the corporate network, such as a laptop being used on the road and then being plugged back into the corporate network, that the filtering policy of the corporate network (for the static employees, for example) will be used for the particular device as long as it is within the corporate network. In accordance with the invention, the client may include a software module that detects whether a particular resource request of the device is going to be communicated over a corporate network (such as when the device on which the client resides has been connected to the corporate network) to disable the client filtering functions for those resource requests being communicated over the corporate network so that the corporate network filtering policy may be used. As another example, a device may be connected to the corporate network but also connected to a wireless modem and the client filtering may be used for resource requests communicated over the wireless modem, but not for resource requests communicated over the corporate network.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. An Internet access filtering system, comprising:
a computer;
a client on a device wherein the client is configured to establish a connection to the computer, the client further comprising a module that gathers information about a request to access a resource by the device and a module that communicates the gathered information to the computer;
the computer further comprising a module that categorizes the resource access of the device based on the gathered information and a module that communicates, in real-time, a resource access decision to the client so that the client controls the access to the resource by the device based on the resource access decision of the computer;
wherein the client further comprises a module that is configured to generate a capability mask for the device and communicates that capability mask to the computer, the capability mask containing information about the filtering capabilities of the device;
wherein the computer is further configured to generate the resource access decision based on the capability mask;
wherein the client further comprises an offline filtering module that controls the resource accesses of the device based on the filtering capabilities of the device when the client is unable to communicate with the computer;
wherein the offline filtering module further comprises an allow all resource access mode, a block all resource access mode and an allow all resource access with logging mode; and
wherein the allow all resource access with logging mode further comprises a module for throttling the offline logs uploaded to the computer in order to control the bandwidth utilized by the offline logs.

2. The system of claim 1, wherein the client has a filtered port list downloaded from the computer that indicates the ports to be filtered and the ports to be treated as HTTP ports.

3. The system of claim 2, wherein the client further comprises an unfiltered ports module that controls the resources accesses of the device for a port not specifically identified as a filtered port.

4. The system of claim 3, wherein the unfiltered port module further comprises an allow all resource access mode, a block all resource access mode and a send to computer for possible filtering and/or logging mode.

5. The system of claim 4, wherein the unfiltered port module mode is selected by the computer.

6. The system of claim 1, wherein the client further comprises a filtering sensitivity module that controls the level of filtering of resource accesses for the client.

7. The system of claim 6, wherein the filtering sensitivity module further comprises a high sensitivity level mode, a medium sensitivity level mode, a low sensitivity level mode and an automatic sensitivity level mode.

8. The system of claim 7, wherein the filtering sensitivity module mode is selected by the computer.

9. The system of claim 1, wherein the computer further comprises a monitor module that monitors the resource accesses of the devices connected to the computer to generate a summary of the resource accesses of the devices.

10. The system of claim 1, wherein the resource being accessed further comprises one of a web page, a file transfer protocol site, an e-mail site, a secure web site, and a news site.

11. The system of claim 1, wherein the device further comprises one of a personal digital assistant, a cellular phone, a personal computer, a laptop computer, a palmtop computer and an appliance.

12. The system of claim 1, wherein the client further comprises a module that detects whether the requested resource is to be communicated over a corporate network and that disables the client filtering for the requested resource being communicated over the corporate network.

13. The system of claim 1, wherein the gathered information and the resource access decision are communicated between the client and computer using a hypertext transfer protocol over TCP port 80.

14. The system of claim 13, wherein the protocol for gathered information further comprises a hypertext transfer protocol POST operation.

15. The system of claim 1, wherein the protocol for the resource access decision further comprises data in a web page format.

16. An Internet access filtering system, comprising:
a computer;
a client on a device wherein the client is configured to establish a connection to the computer, the client further comprising means for gathering information about a request to access a resource by the device and means for communicating the gathered information to the computer;
the computer further comprising means for categorizing the resource access of the device based on the gathered information and means for communicating, in real-time, a resource access decision to the client so that the client controls the access to the resource by the device based on the resource access decision of the computer;
wherein the client further comprises means for generating a capability mask for the device and communicating that capability mask to the computer, the capability mask containing information about the filtering capabilities of the device;
wherein the computer further comprises means for generating the resource access decision based on the capability mask;
wherein the client further comprises means for offline filtering that controls the resource accesses of the device based on the filtering capabilities of the device when the client is unable to communicate with the computer;

wherein the offline filtering means further comprises an allow all resource access mode, a block all resource access mode and an allow all resource access with logging mode; and wherein the allow all resource access with logging mode further comprises means for throttling the offline logs uploaded to the computer in order to control the bandwidth utilized by the offline logs.

17. The system of claim 16, wherein the client has a filtered port list downloaded from the computer that indicates the ports to be filtered and the ports to be treated as HTTP ports.

18. The system of claim 17, wherein the client further comprises means for filtering unfiltered ports that controls the resources accesses of the device for a port not specifically identified as a filtered port.

19. The system of claim 18, wherein the unfiltered port means further comprises an allow all resource access mode, a block all resource access mode and a send to computer for possible filtering and/or logging mode.

20. The system of claim 19, wherein the unfiltered port means mode is selected by the computer.

21. The system of claim 16, wherein the client further comprises means for adjusting the filtering sensitivity that controls the level of filtering of resource accesses for the client.

22. The system of claim 21, wherein the filtering sensitivity means further comprises a high sensitivity level mode, a medium sensitivity level mode, a low sensitivity level mode and an automatic sensitivity level mode.

23. The system of claim 22, wherein the filtering sensitivity means mode is selected by the computer.

24. The system of claim 16, wherein the computer further comprises means for monitoring resource accesses of the devices connected to the computer to generate a summary of the resource accesses of the devices.

25. The system of claim 16, wherein the resource being accessed further comprises one of a web page, an file transfer protocol site, an e-mail site, a secure web site, and a news site.

26. The system of claim 16, wherein the device further comprises one of a personal digital assistant, a cellular phone, a personal computer, a laptop computer, a palmtop computer and an appliance.

27. The system of claim 16, wherein the client further comprises means for detecting whether the requested resource is to be communicated over a corporate network and means for disabling the client filtering for the requested resource being communicated over the corporate network.

28. An Internet access filtering method using a computer and a client on a device that establishes a connection to the computer, the method comprising:
gathering information by the client about a request to access a resource by the device;
communicating the gathered information to the computer;
categorizing, at the computer, the resource access of the device based on the gathered information;
communicating, in real-time, a resource access decision to the client so that the client controls the access to the resource by the device based on the resource access decision of the computer;
generating by the client, a capability mask for the device;
communicating that capability mask to the computer, the capability mask containing information about the filtering capabilities of the device;
generating, by the computer, the resource access decision based on the capability mask;

wherein offline filtering by the client controls the resource accesses of the device based on the filtering capabilities of the device when the client is unable to communicate with the computer;

wherein the offline filtering further comprises an allow all resource access mode, a block all resource access mode and an allow all resource access with logging mode; and wherein the allow all resource access with logging mode further comprises throttling the offline logs uploaded to the computer in order to control the bandwidth utilized by the offline logs.

29. The method of claim 28 further comprising downloading a filtered port list from the computer to the client that indicates the ports to be filtered and the ports to be treated as HTTP ports.

30. The method of claim 29 further comprising filtering unfiltered ports that controls the resources accesses of the device for a port not specifically identified as a filtered port.

31. The method of claim 30, wherein the filtering of the unfiltered ports further comprises an allow all resource access mode, a block all resource access mode and a send to computer for possible filtering and/or logging mode.

32. The method of claim 31, wherein the unfiltered port mode is selected by the computer.

33. The method of claim 28 further comprising adjusting the filtering sensitivity that controls the level of filtering of resource accesses for the client.

34. The method of claim 33, wherein the filtering sensitivity adjustment further comprises a high sensitivity level mode, a medium sensitivity level mode, a low sensitivity level mode and an automatic sensitivity level mode.

35. The method of claim 34, wherein the filtering sensitivity adjustment mode is selected by the computer.

36. The method of claim 28 further comprising monitoring the resource accesses of the devices connected to the computer to generate a summary of the resource accesses of the devices.

37. The method of claim 28, wherein the resource being accessed further comprises one of a web page, an file transfer protocol site, an e-mail site, a secure web site, and a news site.

38. The method of claim 28, wherein the device further comprises one of a personal digital assistant, a cellular phone, a personal computer, a laptop computer, a palmtop computer and an appliance.

39. The method of claim 28 further comprising detecting, by the client, a connection of the device to a corporate network in order to disable the client filtering operation while the device is connected to the corporate network.

40. A server for an Internet access filtering system, comprising:
a module implemented with a processor so as to cause said processor to receive information about a request to access a resource by a remote device wherein the information about the resource access request is communicated from a remote client on the device;
a module implemented with a processor so as to cause said processor to categorize the resource access of the device based on the gathered information;
a module implemented with a processor so as to cause said processor to communicate, in real-time, a resource access decision to the client so that the client controls the access to the resource by the device based on the resource access decision of the processor;
wherein the server further comprises a module implemented with a processor so as to cause said processor to receive a capability mask for the device from a client associated with the device, the capability mask containing information about the filtering capabilities of the device;

wherein the processor is further configured to generate the resource access decision based on the capability mask;

wherein the client associated with the device is configured to control the resource accesses of the device based on the filtering capabilities of the device when the client is unable to connect to the processor;

wherein, when the client is unable to connect to the processor, the client controls the resource accesses of the device with an allow all resource access mode, a block all resource access mode and an allow all resource access with logging mode; and wherein the allow all resource access with logging mode further comprises means for throttling offline logs uploaded to the computer in order to control the bandwidth utilized by the offline logs.

41. The server of claim 40 further comprising an administrator module that sets a filtered ports list that is downloaded to the client that indicates the ports to be filtered and the ports to be treated as HTTP ports.

42. The server of claim 41 further comprising an unfiltered ports module that sets the filtering decisions for each client for a port not specifically identified as a filtered port.

43. The server of claim 42, wherein the unfiltered port module setting further comprises an allow all resource access mode, a block all resource access mode and a send to a computer for possible filtering and/or logging mode.

44. The server of claim 40 further comprising a filtering sensitivity module that sets the filtering sensitivity for each client.

45. The server of claim 44, wherein the filtering sensitivity module settings further comprises a high sensitivity level mode, a medium sensitivity level mode, a low sensitivity level mode and an automatic sensitivity level mode.

46. The server of claim 40 further comprising a monitor module, connected to a computer, that monitors the resource accesses of the devices to generate a summary of the resource accesses of the devices.

47. The server of claim 40, wherein the resource being accessed further comprises one of a web page, an file transfer protocol site, an e-mail site, a secure web site, and a news site.

48. The server of claim 40, wherein the device further comprises one of a personal digital assistant, a cellular phone, a personal computer, a laptop computer, a palmtop computer and an appliance.

49. An Internet access filtering client located on a device that communicates with a remote computer, the client comprising:

a module implemented with a processor so as to cause said processor to gather information about a request to access a resource by the device;

a module implemented with a processor so as to cause said processor to communicates the gathered information to the computer;

a module implemented with a processor so as to cause said processor to receive a resource access decision from the remote computer and controls the access to the resource by the device based on the resource access decision of the computer;

wherein the client further comprises a module implemented with a processor so as to cause said processor to generate a capability mask for the device and to communicate that capability mask to the computer, the capability mask containing information about the filtering capabilities of the device;

wherein the computer is further configured to generate the resource access decision based on the capability mask;

wherein the client is further configured to control the resource accesses of the device based on the filtering capabilities of the device when the client is unable to communicate with the computer;

wherein the client controls the resource accesses of the device with an allow all resource access mode, a block all resource access mode and an allow all resource access with logging mode; and wherein the allow all resource access with logging mode further comprises means for throttling the offline logs uploaded to the computer in order to control the bandwidth utilized by the offline logs.

50. The client of claim 49, wherein the client controls the resource accesses of the device based on a mode selected by the computer.

51. The client of claim 49, wherein the client has a filtered port list downloaded from the computer that indicates the ports to be filtered and the ports to be treated as HTTP ports.

52. The client of claim 51 further comprising an unfiltered ports module that controls the resources accesses of the device for a port not specifically identified as a filtered port.

53. The client of claim 52, wherein the unfiltered port module further comprises an allow all resource access mode, a block all resource access mode and a send to the computer for possible filtering and/or logging mode.

54. The client of claim 53, wherein the unfiltered port module mode is selected by the computer.

55. The client of claim 49 further comprising a filtering sensitivity module that controls the level of filtering of resource accesses for the client.

56. The client of claim 55, wherein the filtering sensitivity module further comprises a high sensitivity level mode, a medium sensitivity level mode, a low sensitivity level mode and an automatic sensitivity level mode.

57. The client of claim 56, wherein the filtering sensitivity module mode is selected by the computer.

58. The client of claim 49, wherein the resource being accessed further comprises one of a web page, an file transfer protocol site, an e-mail site, a secure web site, and a news site.

59. The client of claim 49, wherein the device further comprises one of a personal digital assistant, a cellular phone, a personal computer, a laptop computer, a palmtop computer and an appliance.

60. The client of claim 49 further comprising a module that detects whether the requested resource is to be communicated over a corporate network and that disables the client filtering for the requested resource being communicated over the corporate network.

* * * * *